(12) United States Patent
Sapre et al.

(10) Patent No.: US 12,347,025 B2
(45) Date of Patent: Jul. 1, 2025

(54) RESTRICTING DISPLAY AREA OF APPLICATIONS

(71) Applicant: Apple Inc., Cupertino, CA (US)

(72) Inventors: Meghna Achyut Sapre, Sunnyvale, CA (US); Adam Roben, Swarthmore, PA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/578,131

(22) PCT Filed: Aug. 22, 2022

(86) PCT No.: PCT/US2022/041003
§ 371 (c)(1),
(2) Date: Jan. 10, 2024

(87) PCT Pub. No.: WO2023/034049
PCT Pub. Date: Mar. 9, 2023

(65) Prior Publication Data
US 2024/0320902 A1  Sep. 26, 2024

Related U.S. Application Data

(60) Provisional application No. 63/238,489, filed on Aug. 30, 2021.

(51) Int. Cl.
*G06T 15/40* (2011.01)
*G06F 3/01* (2006.01)

(52) U.S. Cl.
CPC ............. *G06T 15/40* (2013.01); *G06F 3/013* (2013.01)

(58) Field of Classification Search
CPC ...... G06F 3/011; G06F 3/04815; G06F 3/013; G06F 3/048; G06T 15/40; G09G 5/14; G09G 2358/00
See application file for complete search history.

(56) References Cited

U.S. PATENT DOCUMENTS

| | | | | |
|---|---|---|---|---|
| 2009/0125839 A1* | 5/2009 | Kano | ........................ | G09G 5/14 715/788 |
| 2014/0232639 A1* | 8/2014 | Hayashi | .................. | G06F 3/048 345/156 |

(Continued)

FOREIGN PATENT DOCUMENTS

CN   112506345 A   3/2021

OTHER PUBLICATIONS

PCT International Search Report and Written Opinion dated Dec. 19, 2022, PCT International Application No. PCT/US2022/041003, pp. 1-10.

*Primary Examiner* — Hang Lin
(74) *Attorney, Agent, or Firm* — Fernando & Partners, LLP

(57) ABSTRACT

Various implementations disclosed herein include devices, systems, and methods for designating a bounded volumetric region in which an application can display content. In some implementations, a device includes a display, one or more processors, and a memory. While displaying first content associated with a first application within a first bounded region, the device detects a request from a second application to display second content in a second bounded region. If the first application has a first characteristic, the device determines whether the second bounded region obstructs a field of view of the first bounded region from the device. If the second bounded region obstructs the field of view of the first bounded region, the device determines whether to deny the request to display the second content in the second bounded region.

20 Claims, 10 Drawing Sheets

(56) References Cited

U.S. PATENT DOCUMENTS

2016/0041727 A1* 2/2016 Choi ................... G06T 11/60
 715/835
2016/0274764 A1* 9/2016 Moreau ............... H04L 67/306
2019/0073109 A1* 3/2019 Zhang .................. G06F 3/013

* cited by examiner

300

While displaying 1st content associated with 1st application within 1st 3D bounded region, detect request from 2nd application to display 2nd content in 2nd 3D bounded region

- Configure size of 1st 3D bounded region based on whether user is using 1st application 310a

- Configure location of 1st 3D bounded region based on whether user is using 1st application 310b

- Configuring location of 1st 3D bounded region based on whether user is using 1st application comprises selecting central location of field of view if user is using 1st application 310c

- Configuring location of 1st 3D bounded region based on whether user is using 1st application comprises selecting peripheral location of field of view if user is not using 1st application 310d

- Configure location of 1st 3D bounded region based on degree of relevance of 1st application relative to activity performed by user 310e

- 2nd application is not trusted application 310f

- Determine whether 2nd application is trusted application 310g

- Determine that 2nd application is trusted application if 2nd application is created by same developer as 1st application 310h

- Determine that 2nd application is trusted application if 2nd application is created by device manufacturer 310i

- In response to determining that 2nd application is trusted application, grant request to display 2nd content in 2nd 3D bounded region 310j

⎯310

In response to 1st application being trusted application, determine whether 2nd 3D bounded region intersects with line of sight from eye of user to 1st 3D bounded region ⎯320

In response to determining that 2nd 3D bounded region intersects with line of sight from eye to 1st 3D bounded region, deny request to display 2nd content in 2nd 3D bounded region Determine whether 2nd content is within similarity threshold of 1st content 330a 1st content comprises 1st data fields; 2nd content comprises 2nd data fields; determining whether 1st data fields are within similarity threshold of 2nd data fields 330b Determine whether 2nd content satisfies transparency threshold 330c On a condition that 2nd content satisfies transparency threshold, deny request to display 2nd content in 2nd 3D bounded region 330d Modify placement of 2nd 3D bounded region 330e Modify placement of 2nd 3D bounded region to adjusted location such that 2nd 3D bounded region does not intersect with line of sight from eye to 1st 3D bounded region 330f Display 2nd content in 2nd 3D bounded region at adjusted location 330g Receive user input data 330h Determine whether gaze of user was directed to 1st content associated with 1st application when user input data was received 330i Forgo transmission of user input data to 2nd application on a condition that gaze of user was directed to 1st content associated with 1st application when user input data was received 330j

RESTRICTING DISPLAY AREA OF APPLICATIONS

CROSS-REFERENCE TO RELATED APPLICATION

This application claims the benefit of U.S. Provisional Patent App. No. 63/238,489, filed on Aug. 30, 2021, which is incorporated by reference in its entirety.

TECHNICAL FIELD

The present disclosure generally relates to interacting with computer-generated content.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 3A-3B are a flowchart representation of a method of designating a bounded volumetric region in which an application can display content in accordance with some implementations.

Figure 1A:
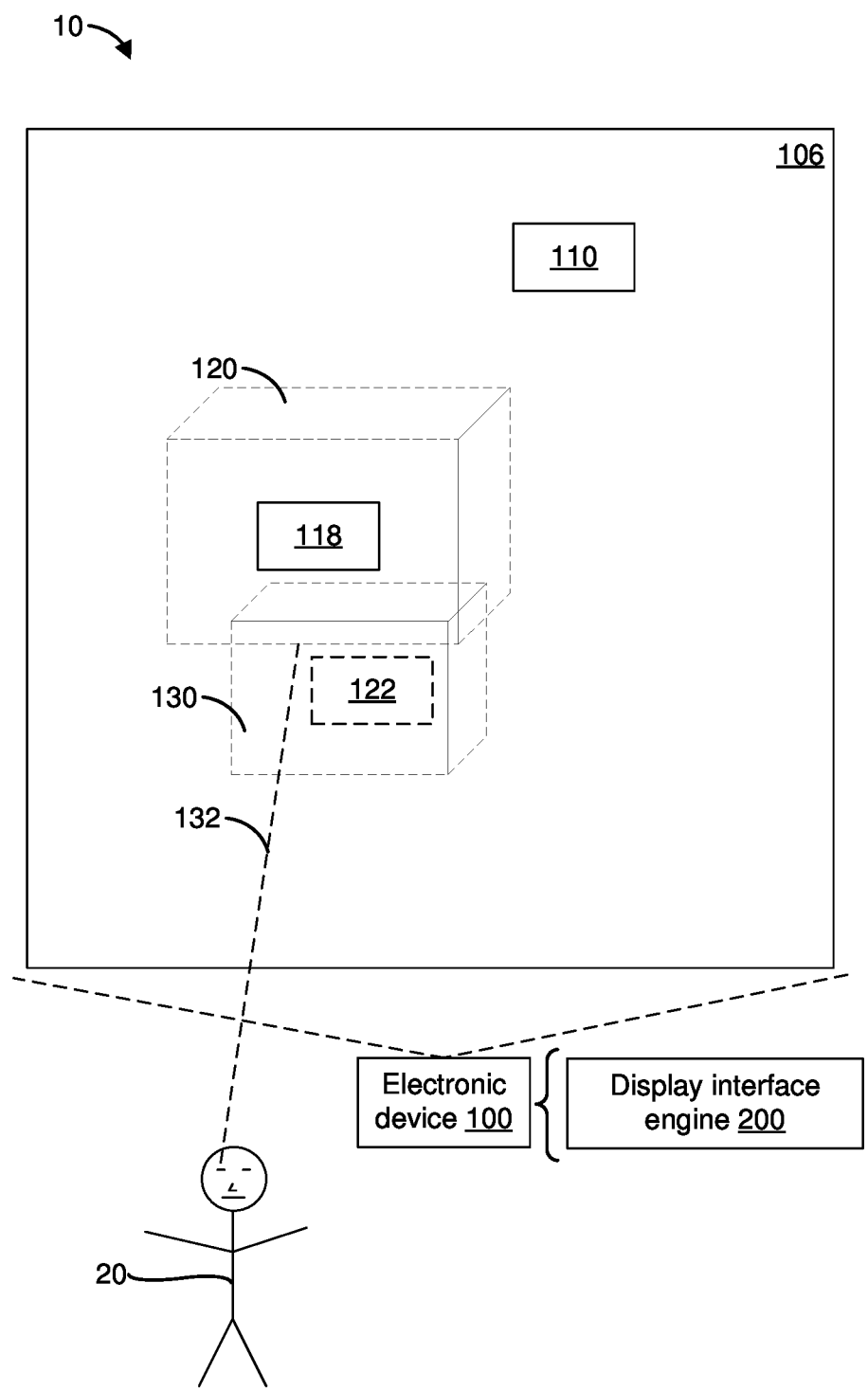
FIGS. 1A-1F are diagrams of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for designating a bounded volumetric region in which an application can display content. In some implementations, a device includes a display, one or more processors, and a memory. While displaying first content associated with a first application within a first bounded region, the device detects a request from a second application to display second content in a second bounded region. If the first application has a first characteristic, the device determines whether the second bounded region obstructs a field of view of the first bounded region from the device. If the second bounded region obstructs the field of view of the first bounded region from the device, the device determines whether to deny the request to display the second content in the second bounded region.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

At least some implementations described herein utilize gaze information to identify objects that the user is focusing on. The collection, storage, transfer, disclosure, analysis, or other use of gaze information should comply with well-established privacy policies and/or privacy practices. Privacy policies and practices that are generally recognized as meeting or exceeding industry or governmental requirements should be implemented and used. The present disclosure also contemplates that the use of a user's gaze information may be limited to what is necessary to implement the described implementations. For instance, in implementations where a user's device provides processing power, the gaze information may be processed locally at the user's device.

Some devices display an extended reality (XR) environment that includes one or more objects, e.g., virtual objects. A user may select or otherwise interact with the objects through a variety of modalities. For example, some devices allow a user to select or otherwise interact with objects using a gaze input. A gaze-tracking device, such as a user-facing image sensor, may obtain an image of the user's pupils. The image may be used to determine a gaze vector. The gaze-tracking device may use the gaze vector to determine which object the user intends to select or interact with.

The present disclosure provides methods, systems, and/or devices for designating a bounded volumetric region in which an application can display content. In various implementations, a method includes designating a bounded volumetric region in which an application can display content. For example, if there are two applications that are displayed, a second application cannot overlay its content onto a window that is associated with a first application. In some implementations, this restriction applies to applications that are created by different developers, but not to applications that are created by the same developer. In some implementations, certain regions of the display can be restricted so that applications created by third-party developers cannot place content in the restricted region, but applications created by a device manufacturer can place content in the restricted region.

In some implementations, designating a bounded volumetric region in which a trusted application can display content improves security, e.g., by preventing other, untrusted, applications from displaying content in the bounded volumetric region and potentially misleading the user by overlaying content over other content from the trusted application.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a display interface engine 200. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-mountable device (HMD) or an electronic watch.

In the example of Figure 1A, the display interface engine 200 resides at the electronic device 100. For example, the electronic device 100 implements the display interface engine 200. In some implementations, the electronic device 100 includes a set of computer-readable instructions corresponding to the display interface engine 200. Although the display interface engine 200 is shown as being integrated into the electronic device 100, in some implementations, the display interface engine 200 is separate from the electronic device 100. For example, in some implementations, the display interface engine 200 resides at another device (e.g., at a controller, a server or a cloud computing platform).

As illustrated in Figure 1A, in some implementations, the electronic device 100 presents an extended reality (XR) environment 106 that includes a field of view of the user 20. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes various virtual objects such as an XR object 110 ("object 110", hereinafter for the sake of brevity). In some implementations, the XR environment 106 includes multiple objects. In some implementations, the virtual objects are referred to as graphical objects or XR objects. In various implementations, the electronic device 100 obtains the objects from an object datastore (not shown). For example, in some implementations, the electronic device 100 retrieves the object 110 from the object datastore. In some implementations, the virtual objects represent physical articles. For example, in some implementations, the virtual objects represent equipment (e.g., machinery such as planes, tanks, robots, motorcycles, etc.). In some implementations, the virtual objects represent fictional elements (e.g., entities from fictional materials, for example, an action figure or a fictional equipment such as a flying motorcycle).

In various implementations, the electronic device 100 (e.g., the display interface engine 200) displays first content 118 associated with a first application within a first three-dimensional (3D) bounded region 120. For example, the electronic device 100 may run an application that displays a user interface for receiving a user input. As another example, the electronic device 100 may run an application that displays an authentication code (e.g., a two-factor authentication code) within the first 3D bounded region 120.

In various implementations, the electronic device 100 (e.g., the display interface engine 200) detects a request from a second application to display second content 122 in a second 3D bounded region 130. For example, the electronic device 100 may run an application that is attempting to receive a user input via a user interface.

The electronic device 100 may determine whether the first application is a trusted application. For example, the electronic device 100 may determine whether the first application is enumerated in a list of trusted applications, e.g., in a database. In some implementations, the electronic device 100 determines whether the first application was authored by a trusted publisher (e.g., a device manufacturer). In some implementations, the electronic device 100 determines whether the first application is characterized as a trusted application. For example, the first application may be associated with a registry value or a flag that characterizes the first application as a trusted application. More generally, in various implementations, the electronic device 100 determines whether the first application is associated with a first characteristic (e.g., a first security characteristic, for example, a first level of trust that makes the first application a trusted application).

If the electronic device 100 determines that the first application is a trusted application, the electronic device 100 may determine whether the second 3D bounded region 130 intersects with a line of sight 132 from an eye of the user 20 to the first 3D bounded region 120. In some implementations, as represented in FIG. 1A, if the second 3D bounded region 130 intersects with the line of sight 132, the electronic device 100 (e.g., the display interface engine 200) denies the request to display the second content 122 in the second 3D bounded region 130, and the second content 122 is not displayed. In some implementations, the electronic device determines whether the second 3D bounded region 130 obstructs a field of view of the first 3D bounded region 120 from the electronic device 100. In some implementations, if the second 3D bounded region 130 obstructs the field of view of the first 3D bounded region 120 from the electronic device 100, the electronic device 100 denies the request to display the second content 122 in the second 3D bounded region 130, and the second content 122 is not displayed. In some implementations, preventing the second application from displaying the second content 122 in the second 3D bounded region 130 improves security by preventing the second application from overlaying the first content 118 with the second content 122 and potentially misleading the user 20 into believing that the second content 122 originates from the first application. The user 20 can be assured that content displayed in the first 3D bounded region 120 originates from the first application.

Figure 1B:
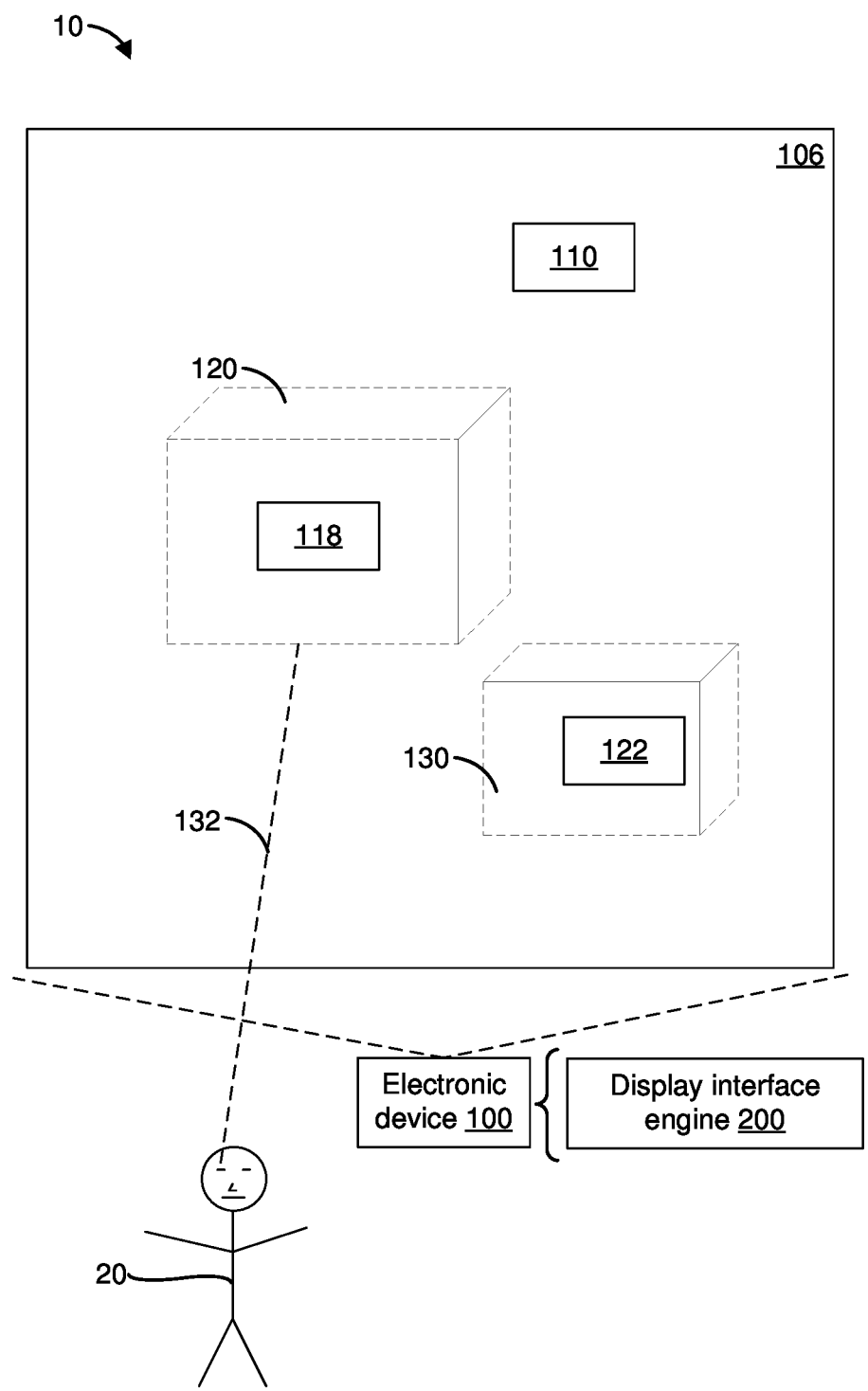

On the other hand, if the electronic device 100 determines that the second 3D bounded region 130 does not intersect with the line of sight 132, as represented in FIG. 1B, the electronic device 100 (e.g., the display interface engine 200) may grant the request to display the second content 122 in the second 3D bounded region 130. In some implementations, if the electronic device 100 determines that the second 3D bounded region 130 does not obstruct the field of view of the first 3D bounded region 120 from the electronic device 100, the electronic device 100 grants the request to display the second content 122 in the second 3D bounded region 130. In some implementations, the electronic device 100 (e.g., the display interface engine 200) displays the second content 122.

In some implementations, the electronic device 100 uses other criteria to determine whether to grant or deny a request to display the second content 122 in the second 3D bounded region 130. For example, the electronic device 100 may determine whether the second content 122 is within a similarity threshold of the first content 118. If the second content 122 is similar to the first content 118, the user 20 may be more likely to confuse the second content 122 for the first content 118 associated with the first application. In some implementations, if the second content 122 is within the similarity threshold of the first content 118, the electronic device 100 denies the request to display the second content 122 in the second 3D bounded region 130. In some implementations, the first content 118 comprises first data fields and the second content 122 comprises second data fields. If the first data fields and the second data fields are within a similarity threshold of each other, the electronic device 100 may determine that the first content 118 and the second content 122 are within the similarity threshold and may deny the request to display the second content 122 in the second 3D bounded region 130.

In some implementations, the electronic device 100 determines whether the second content 122 satisfies a transparency threshold (e.g., whether a transparency value associated with the second content 122 is greater than the transparency threshold). If the second content 122 satisfies the transparency threshold (e.g., if the transparency value is greater than the transparency threshold, for example, if the second content 122 is transparent), the user 20 may be less likely to see the second content 122 if it is overlaid over the first content 118. In some implementations, if the second content 122 satisfies the transparency threshold, the electronic device 100 denies the request to display the second content 122 in the second 3D bounded region 130.

In some implementations, if the electronic device 100 denies the request to display the second content 122 in the second 3D bounded region 130 because the second 3D bounded region 130 intersects with the line of sight 132, a placement of the second 3D bounded region 130 may be modified. For example, the placement of the second 3D bounded region 130 may be modified to an adjusted location (e.g., as represented in FIG. 1B) such that the second 3D bounded region 130 does not intersect with the line of sight 132. In some implementations, the electronic device 100 modifies a placement of the second 3D bounded region 130 in response to determining that the placement of the second 3D bounded region 130 obstructs the field of view of the first 3D bounded region 120. In some implementations, the electronic device 100 (e.g., the display interface engine 200) displays the second content 122 at the adjusted location.

In some implementations, the electronic device 100 prevents the transmission of user input data to the second application even if the second content 122 is displayed in the second 3D bounded region 130. For example, the electronic device 100 may receive user input data. In some implementations, the electronic device 100 determines whether a gaze of the user 20 was directed to the first content 118 associated with the first application when the user input data was received. If so, the user 20 may believe that the user 20 was providing the user input data to the first application (e.g., and not to the second application). If the electronic device 100 determines that the gaze of the user 20 was directed to the first content 118 when the user input data was received, the electronic device 100 may forgo transmission of the user input data to the second application (e.g., the electronic device 100 does not transmit the user input data to a server on which a server-side portion of the second application is being executed).

Figure 1C:
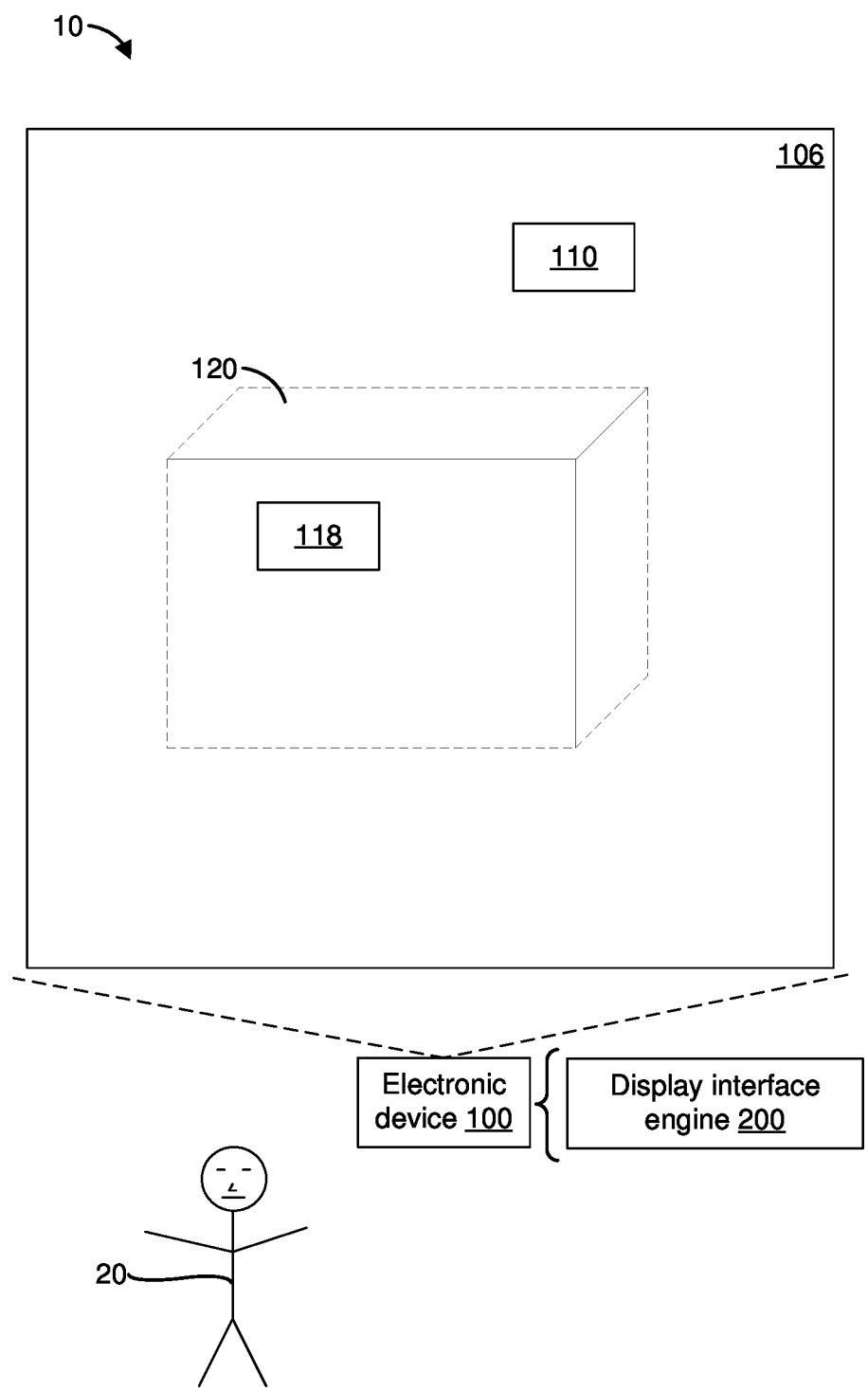
Figure 1D:
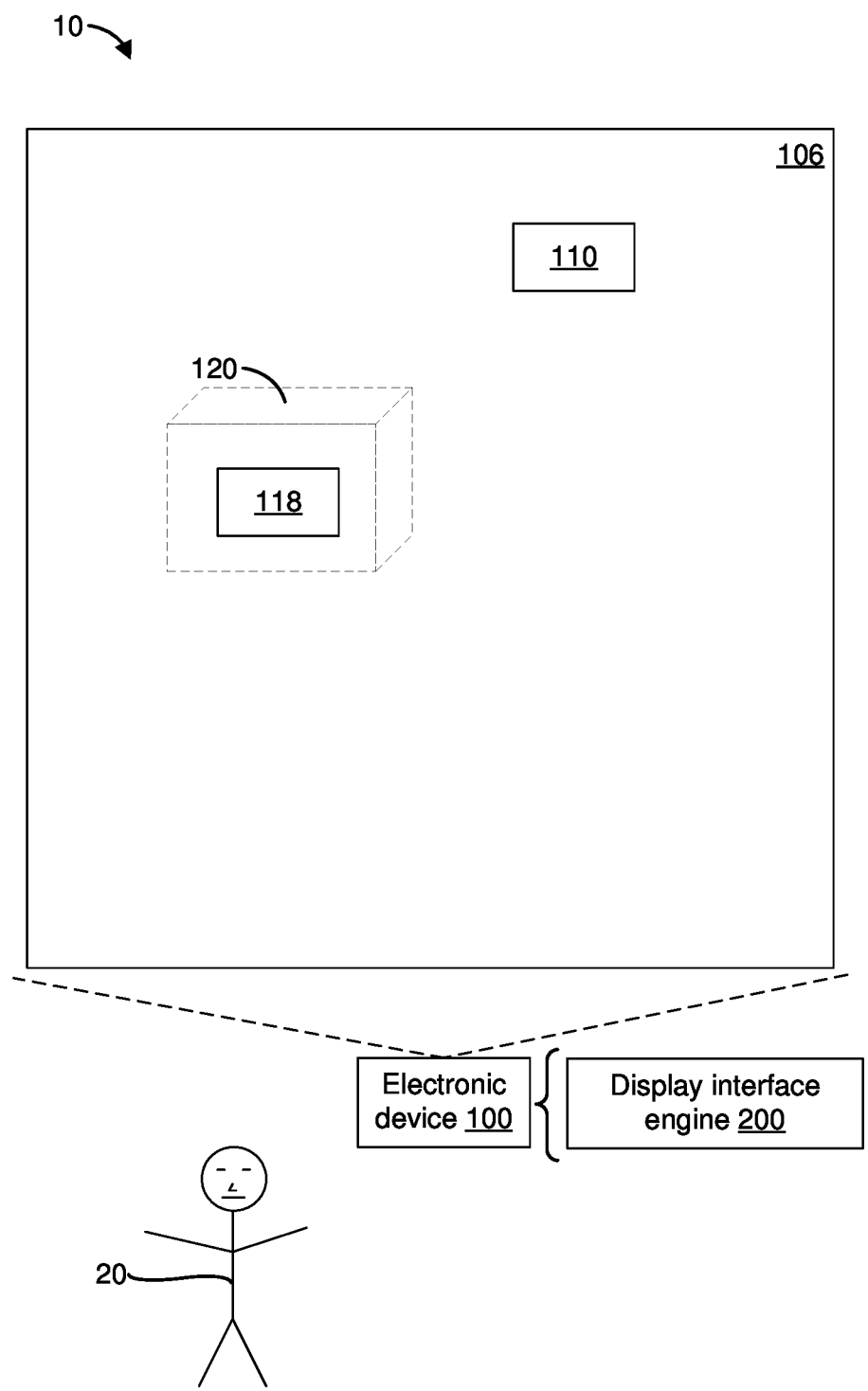

In some implementations, the electronic device 100 (e.g., the display interface engine 200) configures a size of the first 3D bounded region 120 based on whether the user 20 is using the first application. For example, as represented in FIG. 1C, if the user 20 is using the first application, the first 3D bounded region 120 may be assigned a first size. As represented in FIG. 1D, if the user 20 is not using the first application (e.g., if the first application is running in the background), the first 3D bounded region 120 may be assigned a second size that is smaller than the first size.

Figure 1E:
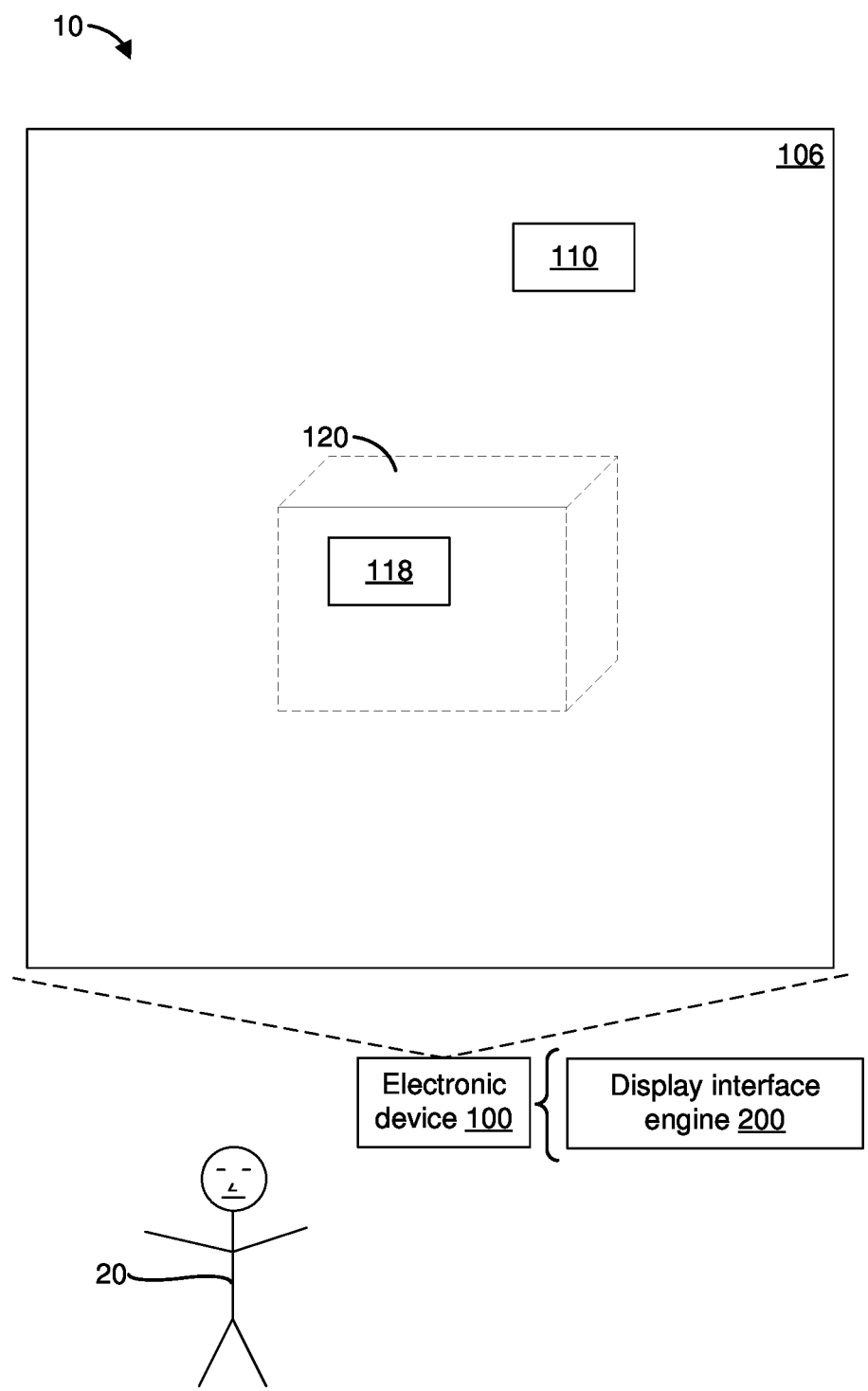
Figure 1F:
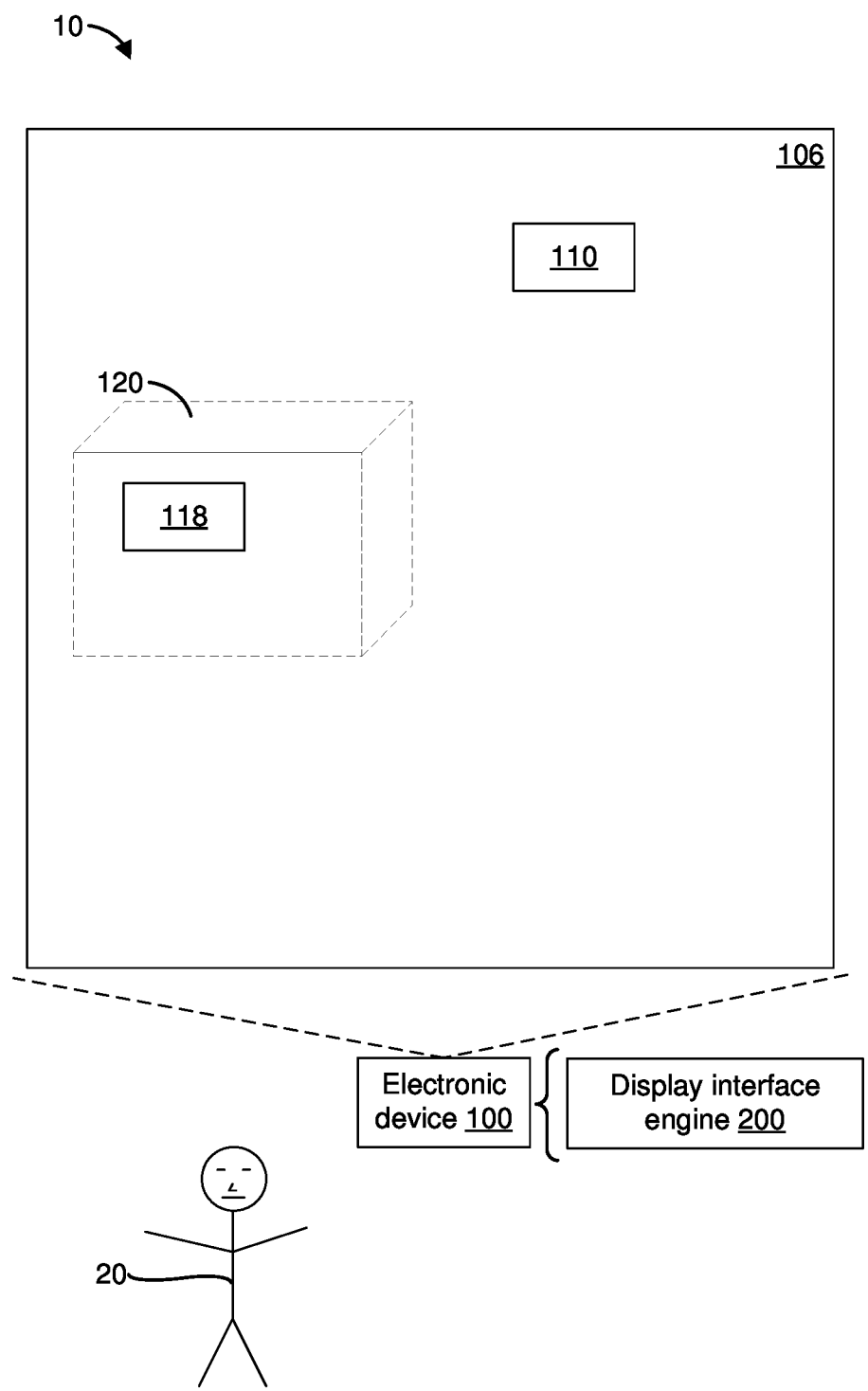

In some implementations, the electronic device 100 (e.g., the display interface engine 200) configures a location of the first 3D bounded region 120 based on whether the user 20 is using the first application. For example, as represented in FIG. 1E, if the user 20 is using the first application, the first 3D bounded region 120 may be assigned a location near a center of a field of view. As represented in FIG. 1F, if the user 20 is not using the first application (e.g., if the first application is running in the background), the first 3D bounded region 120 may be assigned a location that is near a periphery of the field of view. In some implementations, the electronic device 100 (e.g., the display interface engine 200) configures the location of the first 3D bounded region 120 based on a degree of relevance of the first application relative to an activity performed by the user 20. For example, if the user 20 is exercising and the first application is an activity monitoring application or a music application, the first 3D bounded region 120 may be assigned a central location.

In some implementations, the electronic device 100 includes or is attached to a head-mountable device (HMD) that can be worn by the user 20. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 2:
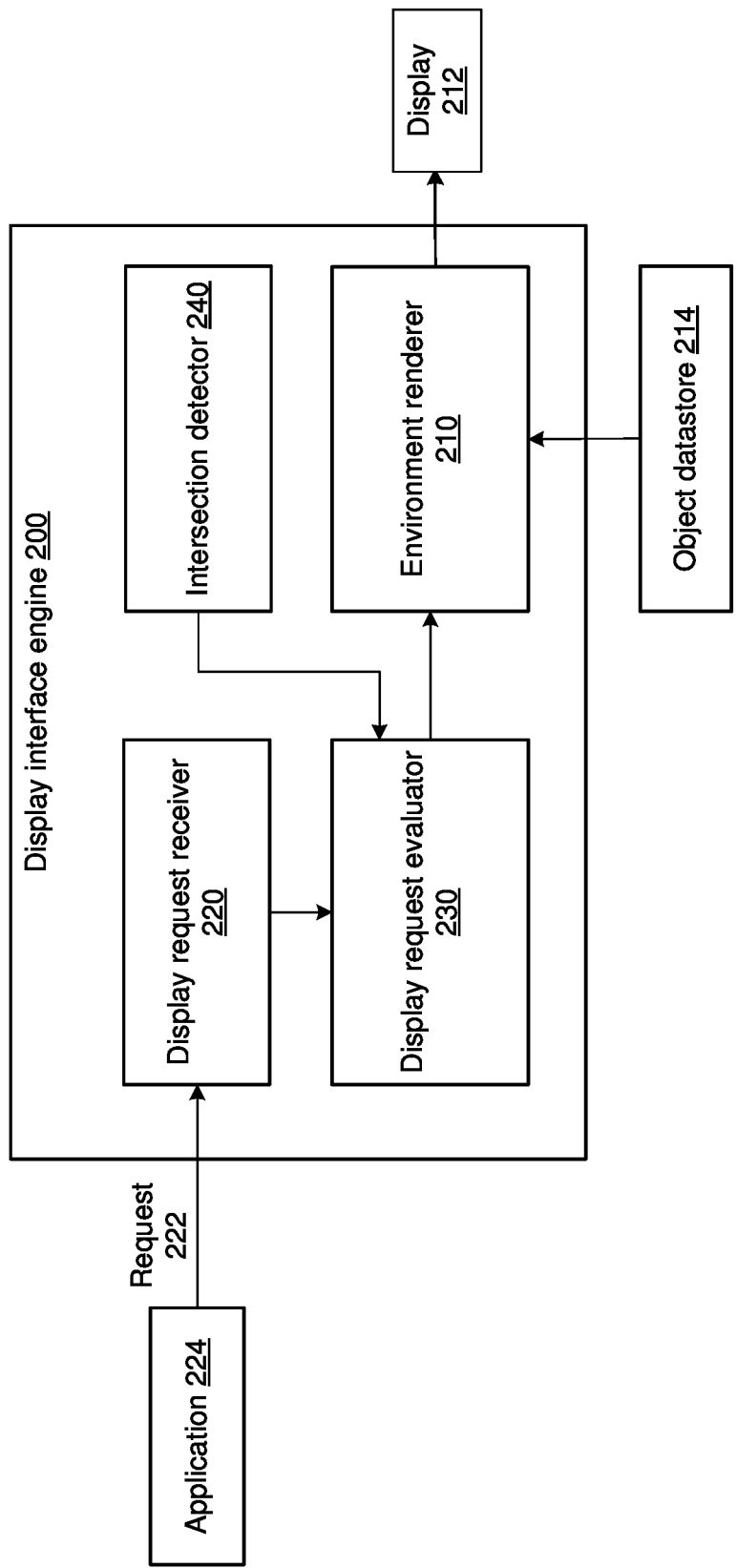
FIG. 2 is a block diagram of a display interface engine in accordance with some implementations.

FIG. 2 illustrates a block diagram of the display interface engine 200 in accordance with some implementations. In some implementations, the display interface engine 200 includes an environment renderer 210, a display request receiver 220, a display request evaluator 230, and an intersection detector 240. In various implementations, the environment renderer 210 displays an extended reality (XR) environment that includes a set of virtual objects in a field of view. For example, with reference to Figure TA, the environment renderer 210 may display the XR environment 106, including the XR object 110, on a display 212. In various implementations, the environment renderer 210 obtains the virtual objects from an object datastore 214. The virtual objects may represent physical articles. For example, in some implementations, the virtual objects represent equipment (e.g., machinery such as planes, tanks, robots, motorcycles, etc.). In some implementations, the virtual objects represent fictional elements.

In some implementations, the environment renderer 210 displays first content associated with a first application within a first 3D bounded region on the display 212. While the environment renderer 210 displays the first content, the display request receiver 220 may detect a request 222 from a second application 224 to display second content in a second 3D bounded region.

In some implementations, the environment renderer 210 configures a size of the first 3D bounded region based on whether the user is using the first application. For example, if the user is using the first application, the first 3D bounded region may be assigned a first size. If the user is not using the first application (e.g., if the first application is running in the background), the first 3D bounded region may be assigned a second size that is smaller than the first size.

In some implementations, the environment renderer 210 configures a location of the first 3D bounded region based on whether the user is using the first application. For example, if the user is using the first application, the first 3D bounded region may be assigned a location near the center of the field of view. If the user is not using the first application (e.g., if the first application is running in the background), the first 3D bounded region may be assigned a location that is near a periphery of the field of view. In some implementations, the environment renderer 210 configures the location of the first 3D bounded region based on a degree of relevance of the first application relative to an activity performed by the user. For example, if the user is exercising and the first application is an activity monitoring application or a music application, the first 3D bounded region may be assigned a central location (e.g., near a center of a field of view).

In some implementations, the display request evaluator 230 determines whether to grant or deny the request to display the second content in the second 3D bounded region. The determination of whether to grant or deny the request may be based in part on whether the first application is a trusted application. For example, the display request evaluator 230 may determine whether the first application is enumerated in a list of trusted applications, e.g., in a database. In some implementations, the display request evaluator 230 determines whether the first application was authored by a trusted publisher (e.g., a device manufacturer). In some implementations, the display request evaluator 230 determines whether the first application is characterized as a trusted application. For example, the first application may be associated with a registry value or a flag that characterizes the first application as a trusted application. In some implementations, the display request evaluator 230 determines whether a user previously provided a user input that designated the first application as a trusted application.

In some implementations, if the display request evaluator 230 determines that the first application is a trusted application, the intersection detector 240 determines whether the second 3D bounded region intersects with a line of sight from an eye of the user to the first 3D bounded region. In some implementations, if the second 3D bounded region intersects with the line of sight, the display request evaluator 230 denies the request to display the second content in the second 3D bounded region, and the second content is not displayed. In some implementations, preventing the second application 224 from displaying the second content in the second 3D bounded region improves security by preventing the second application 224 from overlaying the first content with the second content and potentially misleading the user into believing that the second content originates from the first application. The user can be assured that content displayed in the first 3D bounded region originates from the first application.

On the other hand, if the intersection detector 240 determines that the second 3D bounded region does not intersect with the line of sight, the display request evaluator 230 may grant the request to display the second content in the second 3D bounded region. In some implementations, the environment renderer 210 causes the second content to be displayed on the display 212. In some implementations, the intersection detector 240 determines whether the second 3D bounded region obstructs a field of view of the first 3D bounded region from the device. As such, the intersection detector 240 may be referred to as a field of view (FOV) obstruction detector or an FOV obstruction detector.

In some implementations, the display request evaluator 230 uses other criteria to determine whether to grant or deny a request to display the second content 122 in the second 3D bounded region. For example, the display request evaluator 230 may determine whether the second content is within a similarity threshold of the first content. If the second content is similar to the first content, the user may be more likely to confuse the second content for the first content associated with the first application. In some implementations, if the second content is within the similarity threshold of the first content, the display request evaluator 230 denies the request to display the second content in the second 3D bounded region. In some implementations, the first content comprises first data fields and the second content comprises second data fields. If the first data fields and the second data fields are within a similarity threshold of each other, the display request evaluator 230 may determine that the first content and the second content are within the similarity threshold and may deny the request to display the second content in the second 3D bounded region.

In some implementations, the display request evaluator 230 determines whether the second content satisfies a transparency threshold. If the second content satisfies the transparency threshold, the user may be less likely to see the second content if it is overlaid over the first content. In some implementations, the display request evaluator 230 denies the request to display the second content in the second 3D bounded region if the second content satisfies the transparency threshold (e.g., if the second content is transparent). In various implementations, the display request evaluator 230 denies a request from an untrusted application to display content at a location that intersects with a line of sight between an eye of the user and content displayed by a trusted application. In some implementations, the display request evaluator 230 denies a request from an untrusted application to display content at a location that obstructs a field of view of a trusted application from a current point-of-view (POV) of the device. In some implementations, the display request evaluator 230 denies a request from an untrusted application to overlay content (e.g., transparent content) on top of content displayed by a trusted application. More generally, in some implementations, when the display request evaluator 230 evaluates a request to overlay content on top of content displayed by a first application having a first characteristic, the display request evaluator 230 denies the request in response to the request being a second application that does not have the first characteristic. For example, the display request evaluator 230 denies a request from an application associated with a lower security classification to overlay content on top of content displayed by another application associated with a higher security classification.

In some implementations, the display request evaluator 230 determines whether the second application 224 is a trusted application. For example, the display request evaluator 230 may determine that the second application 224 is a trusted application if the second application 224 is created by a same developer as the first application. In some implementations, the display request evaluator 230 determines that the second application 224 is a trusted application if the second application 224 is created by a manufacturer of the device.

In some implementations, if the display request evaluator 230 denies the request to display the second content in the second 3D bounded region because the second 3D bounded region intersects with the line of sight from the eye of the user to the first 3D bounded region, the environment renderer 210 may modify a placement of the second 3D bounded region, e.g., to an adjusted location such that the second 3D bounded region does not intersect with the line of sight. In some implementations, the environment renderer 210 causes the second content to be displayed on the display at the adjusted location in the field of view of the user.

In some implementations, the display interface engine 200 prevents the transmission of user input data to the second application 224 even if the second content is displayed in the second 3D bounded region. For example, the display interface engine 200 may receive user input data. In some implementations, the display interface engine 200 determines whether a gaze of the user was directed to the first content associated with the first application when the user input data was received. If so, the user may believe that the user was providing the user input data to the first application (e.g., and not to the second application 224). If the display interface engine 200 determines that the gaze of the user was directed to the first content when the user input data was received, the display interface engine 200 may forgo transmission of the user input data to the second application.

FIGS. 3A-3B are a flowchart representation of a method 300 for designating a bounded volumetric region in which an application can display content in accordance with various implementations. In various implementations, the method 300 is performed by a device (e.g., the electronic device 100 shown in FIGS. 1A-1F, or the display interface engine 200 shown in FIGS. 1A-1F and 2). In some implementations, the method 300 is performed by processing logic, including hardware, firmware, software, or a combination thereof. In some implementations, the method 300 is performed by a processor executing code stored in a non-transitory computer-readable medium (e.g., a memory).

In various implementations, an XR environment comprising a field of view is displayed. In some implementations, the XR environment is generated. In some implementations, the XR environment is received from another device that generated the XR environment.

The XR environment may include a virtual environment that is a simulated replacement of a physical environment. In some implementations, the XR environment is synthesized and is different from a physical environment in which the electronic device is located. In some implementations, the XR environment includes an augmented environment that is a modified version of a physical environment. For example, in some implementations, the electronic device modifies the physical environment in which the electronic device is located to generate the XR environment. In some implementations, the electronic device generates the XR environment by simulating a replica of the physical environment in which the electronic device is located. In some implementations, the electronic device removes and/or adds items from the simulated replica of the physical environment in which the electronic device is located to generate the XR environment.

In some implementations, the electronic device includes a head-mountable device (HMD). The HMD may include an integrated display (e.g., a built-in display) that displays the XR environment. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display. In some implementations, the display of the device attached to the head-mountable enclosure presents (e.g., displays) the XR environment. In various implementations, examples of the electronic device include smartphones, tablets, media players, laptops, etc.

In various implementations, as represented by block 310, the method 300 includes displaying, within a three-dimensional environment, first content associated with a first application within a first 3D bounded region. While the first content is displayed within the three-dimensional environment, a request is detected from a second application to display second content in a second 3D bounded region. For example, the second application may attempt to display a user interface for requesting a user input from the user.

The first content is displayed within a first 3D bounded region. In some implementations, as represented by block 310a, the method 300 includes configuring the size of the first 3D bounded region based on whether the user is using the first application. For example, if the first application is running in the foreground, the first 3D bounded region may be assigned a first size in the field of view of the user. If the first application is running in the background, the first 3D bounded region may be assigned a second size, smaller than the first size, in the field of view of the user. In some implementations, as represented by block 310b, the method 300 includes configuring the location of the first 3D bounded region based on whether the user is using the first application. For example, as represented by block 310c, configuring the location of the first 3D bounded region based on whether the user is using the first application may include selecting a central location in the field of view if the user is using the first application. As represented by block 310d, a peripheral location of the field of view may be selected if the user is not using the first application. In some implementations, as represented by block 310e, the location of the first 3D bounded region is configured based on a degree of relevance of the first application relative to an activity performed by the user.

In some implementations, as represented by block 310f, the second application does not have a first characteristic, for example, because the second application is not a trusted application. If the second application does not have the first characteristic (e.g., is not a trusted application) and the second bounded region intersects with the line of sight from the eye to the first bounded region, the request to display the second content in the second bounded region may be denied. As represented by block 310g, the method 300 may include determining whether the second application has the first characteristic, for example, determining whether the second application is a trusted application. For example, as represented by block 310h, it may be determined that the second application has the first characteristic (e.g., is a trusted application) if the second application is created by a same developer as the first application. In some implementations, as represented by block 310i, the second application is determined to have the first characteristic (e.g., be a trusted application) if the second application is created by the device manufacturer. In some implementations, as represented by block 310j, the method 300 includes granting the request to display the second content in the second 3D bounded region in response to determining that the second application has the first characteristic (e.g., is a trusted application). In some implementations, the second application does not have the first characteristic (e.g., is not a trusted application) if the user has not provided a user input that associates the second application with the first characteristic (e.g., designates the second application as a trusted application).

In various implementations, as represented by block 320, the method 300 includes determining whether the second 3D bounded region obstructs a field of view of the first 3D bounded region from the device in response to the first application having a first characteristic (e.g., being a trusted application). The electronic device may determine that the first application has the first characteristic (e.g., is a trusted application), for example, if the first application is enumerated in a list of applications that have the first characteristic, for example, in a list of trusted applications, e.g., in a database. In some implementations, the electronic device determines whether the first application was authored by a particular entity, for example, a trusted publisher (e.g., a device manufacturer). In some implementations, the electronic device determines whether the first application has the first characteristic (e.g., is characterized as a trusted application), e.g., by association with a registry value or a flag or by the user. In some implementations, the electronic device determines that the first application has the first characteristic (e.g., is a trusted application) if the user has interacted with the first application for at least a threshold duration.

If the second 3D bounded region does not obstruct the field of view of the first 3D bounded region from the device, the request to display the second content in the second 3D bounded region may be granted. However, as represented by block 330 of FIG. 3B, if the second 3D bounded region obstructs the field of view of the first 3D bounded region from the device, the request to display the second content in the second 3D bounded region may be denied. Preventing the second application from displaying the second content in the second 3D bounded region may improve security by preventing the second application from overlaying the second content over the first content and potentially misleading the user into believing that the second content originates from the first application. The user can be assured that content displayed in the first 3D bounded region originates from the first application.

In some implementations, the method 300 may use other criteria to determine whether to grant or deny a request to display the second content in the second 3D bounded region. For example, as represented by block 330a, the method 300 may include determining whether the second content is within a similarity threshold of the first content. If the second content is similar to the first content, the user may be more likely to confuse the second content for the first content associated with the first application. In some implementations, if the second content is within the similarity threshold of the first content, the request to display the second content in the second 3D bounded region is denied. In some implementations, as represented by block 330b, the first content comprises first data fields and the second content comprises second data fields. If the first data fields and the second data fields are within a similarity threshold of each other, it may be determined that the first content and the second content are within the similarity threshold. The request to display the second content in the second 3D bounded region may be denied.

In some implementations, as represented by block 330c, the method 300 includes determining whether the second content satisfies a transparency threshold. If the second content satisfies the transparency threshold, the user may be less likely to see the second content if it is overlaid over the first content. In some implementations, as represented by block 330d, the request to display the second content in the second 3D bounded region is denied if the second content satisfies the transparency threshold. In some implementations, the method 300 includes determining to deny the request to display the second content in the second bounded region based on a spatial overlap between the first bounded region and second bounded region, and denying the request to display the second content in the second bounded region. In some implementations, the method 300 includes preventing the second application from displaying the second content within a threshold distance of the first content. Not displaying the second content proximate to the first content reduces a likelihood that the second content will be mistaken as originating from the first application.

In some implementations, as represented by block 330e, the placement of the second 3D bounded region may be modified. For example, if the request to display the second content in the second 3D bounded region is denied because the second 3D bounded region obstructs the field of view of the first 3D bounded region from the device, the placement of the second 3D bounded region may be modified, e.g., to an adjusted location such that the second 3D bounded region does not obstruct the field of view of the first 3D bounded region from the device, as represented by block 330f. In some implementations, as represented by block 330g, the second content is displayed at the adjusted location in the field of view of the user.

In some implementations, the transmission of user input data to the second application or a remote computing device associated with the second application (e.g., to a server executing a server-side portion of the second application, for example, to a server hosting the second application) is prevented even if the second content is displayed in the second 3D bounded region. For example, as represented by block 330h, the method 300 may include receiving user input data. In some implementations, as represented by block 330i, it is determined whether a gaze of the user was directed to the first content associated with the first application when the user input data was received. If so, the user may believe that the user was providing the user input data to the first application (e.g., and not to the second application). On a condition that the gaze of the user was directed to the first content when the user input data was received, the method 300 may include forgoing transmission of the user input data to the second application, as represented by block 330j.

Figure 4:
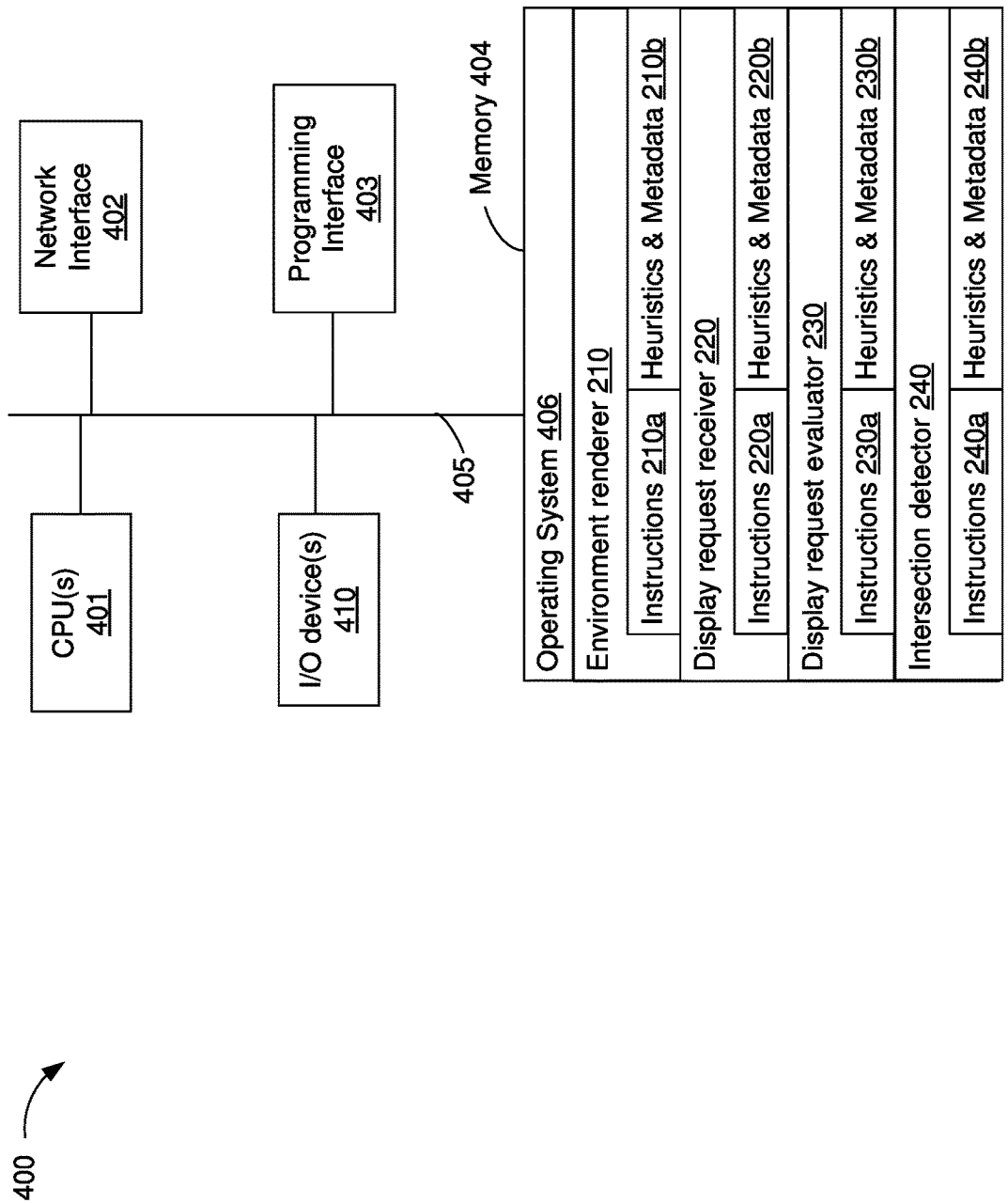
FIG. 4 is a block diagram of a device that designates a bounded volumetric region in which an application can display content in accordance with some implementations.

FIG. 4 is a block diagram of a device 400 in accordance with some implementations. In some implementations, the device 400 implements the electronic device 100 shown in FIGS. 1A-1F, and/or the display interface engine 200 shown in FIGS. 1A-1F and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and/or maintain a metadata tunnel between a cloud hosted network management system and at least one private network including one or more compliant devices. In some implementations, the one or more communication buses 405 include circuitry that interconnects and/or controls communications between system components. In some implementations, the memory 404 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. The memory 404 may include one or more storage devices remotely located from the one or more CPUs 401. The memory 404 includes a non-transitory computer readable storage medium.

In some implementations, the memory 404 or the non-transitory computer readable storage medium of the memory 404 stores the following programs, modules and data structures, or a subset thereof including an optional operating system 406, the environment renderer 210, the display request receiver 220, the display request evaluator 230, and the intersection detector 240. In various implementations, the device 400 performs the method 300 shown in FIGS. 3A-3B.

In some implementations, the environment renderer 210 displays an extended reality (XR) environment that includes a set of virtual objects in a field of view. In some implementations, the environment renderer 210 includes instructions 210a and heuristics and metadata 210b.

In some implementations, the display request receiver 220 detects a request from a second application to display second content in a second 3D bounded region. In some implementations, the display request receiver 220 performs the operation(s) represented by block 310 in FIGS. 3A-3B. To that end, the display request receiver 220 includes instructions 220a and heuristics and metadata 220b.

In some implementations, the display request evaluator 230 determines whether to grant or deny the request to display the second content in the second 3D bounded region. In some implementations, the display request evaluator 230 performs the operations represented by block 330 in FIGS. 3A-3B. To that end, the display request evaluator 230 includes instructions 230a and heuristics and metadata 230b.

In some implementations, the intersection detector 240 determines whether the second 3D bounded region obstructs a field of view of the first 3D bounded region from a current point-of-view of the device. In some implementations, the intersection detector 240 performs the operations represented by block 320 in FIGS. 3A-3B. To that end, the intersection detector 240 includes instructions 240a and heuristics and metadata 240b.

In some implementations, the one or more I/O devices 410 include a user-facing image sensor. In some implementations, the one or more I/O devices 410 include one or more head position sensors that sense the position and/or motion of the head of the user. In some implementations, the one or more I/O devices 410 include a display for displaying the graphical environment (e.g., for displaying the XR environment 106). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

FIG. 4 is intended as a functional description of various features which may be present in a particular implementation as opposed to a structural schematic of the implementations described herein. Items shown separately could be combined and some items could be separated. For example, some functional blocks shown separately in FIG. 4 could be implemented as a single block, and various functions of single functional blocks may be implemented by one or more functional blocks in various implementations. The actual number of blocks and the division of particular functions and how features are allocated among them can vary from one implementation to another and, in some implementations, may depend in part on the particular combination of hardware, software, and/or firmware chosen for a particular implementation.

Various aspects of implementations within the scope of the appended claims are described above. However, it should be apparent that the various features of implementations described above may be embodied in a wide variety of forms and that any specific structure and/or function described above is merely illustrative. Based on the present disclosure, one skilled in the art should appreciate that an aspect described herein may be implemented independently of other aspects and that two or more aspects described herein may be combined in various ways. For example, an apparatus may be implemented and/or a method may be practiced using a number of the aspects set forth herein. Additionally, such an apparatus may be implemented and/or such a method may be practiced using other structure and/or functionality in addition to or other than one or more of the aspects set forth herein.

What is claimed is:

1. A method comprising:
   at a device comprising a display, one or more processors, and a memory:
   while displaying, within a three-dimensional environment, first content associated with a first application within a first bounded region:
   detecting a request from a second application to display second content in a second bounded region; and
   in response to the first application having a first characteristic:
   determining whether the second bounded region obstructs a field of view of the first bounded region from the device; and
   in response to determining that the second bounded region obstructs the field of view of the first bounded region from the device, determining whether to deny the request to display the second content in the second bounded region.

2. The method of claim 1, further comprising configuring a size of the first bounded region based on whether a user is using the first application.

3. The method of claim 1, further comprising configuring a location of the first bounded region based on whether a user is using the first application.

4. The method of claim 1, further comprising configuring a location of the first bounded region based on a degree of relevance of the first application relative to an activity performed by a user.

5. The method of claim 1, further comprising determining that the first application has the first characteristic in response to determining that the first application was created by a manufacturer of the device.

6. The method of claim 1, further comprising determining that the first application has the first characteristic in response to obtaining a user input that associates the first application with the first characteristic.

7. The method of claim 1, further comprising determining that the first application has the first characteristic in response to determining that a user has interacted with the first application for at least a threshold time duration.

8. The method of claim 1, wherein determining whether to deny the request to display the second content in the second bounded region comprises:
   determining whether the second application has the first characteristic;
   on a condition that the second application does not have the first characteristic, determining to deny the request to display the second content in the second bounded region; and
   denying the request to display the second content in the second bounded region.

9. The method of claim 1, wherein the first content comprises first data fields and the second content comprises second data fields, and wherein determining whether to deny the request to display the second content in the second bounded region comprises:
   determining to deny the request to display the second content in the second bounded region on a condition that the first data fields are within a similarity threshold of the second data fields; and
   denying the request to display the second content in the second bounded region.

10. The method of claim 1, wherein determining whether to deny the request to display the second content in the second bounded region comprises:
    determining to deny the request to display the second content in the second bounded region on a condition that the second content satisfies a transparency threshold; and
    denying the request to display the second content in the second bounded region.

11. The method of claim 1, wherein determining whether to deny the request to display the second content in the second bounded region comprises:
    determining to deny the request to display the second content in the second bounded region based on a spatial overlap between the first bounded region and second bounded region; and
    denying the request to display the second content in the second bounded region.

12. The method of claim 1, further comprising, in response to determining that the second bounded region obstructs the field of view of the first bounded region from the device, modifying a placement of the second bounded region.

13. The method of claim 1, further comprising determining whether a gaze of a user was directed to the first content associated with the first application when user input data was received.

14. The method of claim 13, further comprising forgoing transmission of the user input data to the second application on a condition that the gaze of the user was directed to the first content associated with the first application when the user input data was received.

15. The method of claim 1, further comprising, in response to determining that the second application has the first characteristic, granting the request to display the second content in the second bounded region.

16. The method of claim 1, wherein the device comprises a head-mountable device (HMD).

17. A device comprising:
    one or more processors;
    a non-transitory memory;
    a display;
    an input device; and
    one or more programs stored in the non-transitory memory, which, when executed by the one or more processors, cause the device to:
    while displaying, within a three-dimensional environment, first content associated with a first application within a first bounded region:
    detect a request from a second application to display second content in a second bounded region; and
    in response to the first application having a first characteristic:
    determine whether the second bounded region obstructs a field of view of the first bounded region from the device; and
    in response to determining that the second bounded region obstructs the field of view of the first bounded region from the device, determine whether to deny the request to display the second content in the second bounded region.

18. The device of claim 17, wherein the one or more programs further cause the device to determine that the first application has the first characteristic in response to determining that the first application was created by a manufacturer of the device.

19. A non-transitory memory storing one or more programs, which, when executed by one or more processors of a device, cause the device to:
   while displaying, within a three-dimensional environment, first content associated with a first application within a first bounded region:
      detect a request from a second application to display second content in a second bounded region; and
      in response to the first application having a first characteristic:
         determine whether the second bounded region obstructs a field of view of the first bounded region from the device; and
         in response to determining that the second bounded region obstructs the field of view of the first bounded region from the device, determine whether to deny the request to display the second content in the second bounded region.

20. The non-transitory memory of claim 19, wherein the one or more programs further cause the device to determine that the first application has the first characteristic in response to obtaining a user input that associates the first application with the first characteristic.

* * * * *